US010029752B2

(12) United States Patent
Gilles, Jr.

(10) Patent No.: US 10,029,752 B2
(45) Date of Patent: Jul. 24, 2018

(54) SADDLEBAG SUPPORT APPARATUS

(71) Applicant: Douglas James Gilles, Jr., Manhattan, KS (US)

(72) Inventor: Douglas James Gilles, Jr., Manhattan, KS (US)

( * ) Notice: Subject to any disclaimer, the term of this patent is extended or adjusted under 35 U.S.C. 154(b) by 79 days.

(21) Appl. No.: 14/924,726

(22) Filed: Oct. 28, 2015

(65) Prior Publication Data

US 2016/0114847 A1 Apr. 28, 2016

Related U.S. Application Data

(60) Provisional application No. 62/069,818, filed on Oct. 28, 2014.

(51) Int. Cl.
*B62J 7/02* (2006.01)
*B62J 7/04* (2006.01)
*B62J 9/00* (2006.01)

(52) U.S. Cl.
CPC ..................................... *B62J 7/04* (2013.01); *B62J 9/001* (2013.01)

(58) Field of Classification Search
CPC ....... B62J 7/02; B62J 9/001; B62J 7/04; B62J 9/006
USPC ................................ 224/413, 427, 426, 419
See application file for complete search history.

(56) References Cited

U.S. PATENT DOCUMENTS 2,109,315 A * 2/1938 Harley ...................... B62J 7/04 224/413
2,553,739 A 5/1951 Ashdowne
2,636,652 A * 4/1953 Foringer ................. B62J 11/00 224/413
3,495,749 A * 2/1970 Meadowcroft .......... B62J 11/00 224/413
3,791,563 A * 2/1974 Raat .......................... B62J 7/04 224/413
3,901,534 A * 8/1975 Popken ..................... B62J 1/20 224/413
4,359,233 A * 11/1982 Jackson .................. B62J 9/008 224/413
4,442,960 A * 4/1984 Vetter ....................... B62J 9/00 190/108
5,762,249 A 6/1998 Hann
6,234,266 B1 5/2001 Saiki (Continued)

*Primary Examiner* — Brian D Nash
(74) *Attorney, Agent, or Firm* — Ash Tankha; Lipton, Weinberger & Husick

(57) ABSTRACT

A saddlebag support apparatus includes at least two arms and a support frame with a geometric shape. The arms are removably connected, for example, to a rear section of a vehicle, for example, a motorcycle. The support frame extends from lower ends of the arms. The support frame defines a receptacle for receiving one or more attachment elements of a saddlebag to secure the saddlebag to the support frame. The saddlebag support apparatus includes an interconnecting member positioned and connected between the two arms for precluding deflection of the support frame when the saddlebag is mounted onto the support frame, thereby providing rigidity to the support frame. The saddlebag support apparatus includes one or more connector elements positioned at predetermined locations on an inner plane of the support frame for receiving and accommodating one or more attachment elements of the saddlebag to secure the saddlebag to the support frame.

12 Claims, 14 Drawing Sheets

(56) References Cited

U.S. PATENT DOCUMENTS

| | | | | |
|---|---|---|---|---|
| 6,820,782 | B1 | 11/2004 | Monson | |
| 7,278,560 | B2 | 10/2007 | Aron | |
| 8,882,128 | B2 * | 11/2014 | Komatsu | B62J 7/04 180/219 |
| 2004/0149792 | A1 | 8/2004 | Akita et al. | |
| 2009/0001114 | A1 | 1/2009 | Sonnetag et al. | |
| 2010/0012695 | A1 * | 1/2010 | DeMilio | B62J 7/04 224/413 |
| 2010/0243691 | A1 * | 9/2010 | Salisbury | B62J 1/12 224/413 |
| 2013/0062381 | A1 | 3/2013 | Mize, Jr. | |

* cited by examiner

SADDLEBAG SUPPORT APPARATUS

CROSS-REFERENCE TO RELATED APPLICATIONS

This application claims priority to and the benefit of provisional patent application No. 62/069,818 titled "Saddlebag Support Apparatus", filed in the United States Patent and Trademark Office on Oct. 28, 2014. The specification of the above referenced patent application is incorporated herein by reference in its entirety.

BACKGROUND

Motorcycling is a means of transportation and also a leisure time activity for many users. For activities such as transportation and leisure, a motorcycle typically lacks cargo carrying capabilities. Many motorcycle owners use saddlebags mounted to the rear of the motorcycle to address the cargo carrying deficiency. While substantially rigid, non-flexible saddlebags are typically incorporated on the rear of the motorcycle, many motorcycle owners prefer the flexibility of aftermarket flexible saddlebags. However, flexible saddlebags are typically difficult to mount on the rear of the motorcycle because they interfere with passenger hand grips, mufflers, fenders, etc., and are difficult to install and secure in place. Therefore, there is a need for an apparatus by which flexible saddlebags can be easily mounted to a motorcycle without affecting other systems and components of the motorcycle.

Hence, there is a long felt but unresolved need for a saddlebag support apparatus for removably attaching one or more flexible saddlebags to a vehicle, for example, a motorcycle, for carrying items or cargo on the vehicle.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended to determine the scope of the claimed subject matter.

The saddlebag support apparatus disclosed herein addresses the above stated need for an apparatus that removably attaches one or more saddlebags to a vehicle, for example, a motorcycle, for carrying items or cargo on the vehicle, without affecting other systems and components of the vehicle. The saddlebag support apparatus disclosed herein comprises at least two arms and a support frame with a geometric shape. The arms are removably connected to a rear section of the vehicle. The support frame extends from the lower ends of the arms. The support frame defines a receptacle for receiving one or more attachment elements, for example, straps of a saddlebag to secure the saddlebag to the support frame. In an embodiment, the saddlebag support apparatus disclosed herein further comprises one or more connector elements positioned at predetermined locations on an inner plane of the support frame. The connector elements comprise openings for receiving and accommodating one or more attachment elements of the saddlebag to secure the saddlebag to the support frame.

Disclosed herein is also a kit comprising the saddlebag support apparatus as disclosed above and a saddlebag detachably attached to the saddlebag support apparatus for carrying items on the vehicle. The saddlebag comprises one or more attachment elements configured to be inserted into the openings of the connector elements of the saddlebag support apparatus and secured to the support frame of the saddlebag support apparatus.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1A:
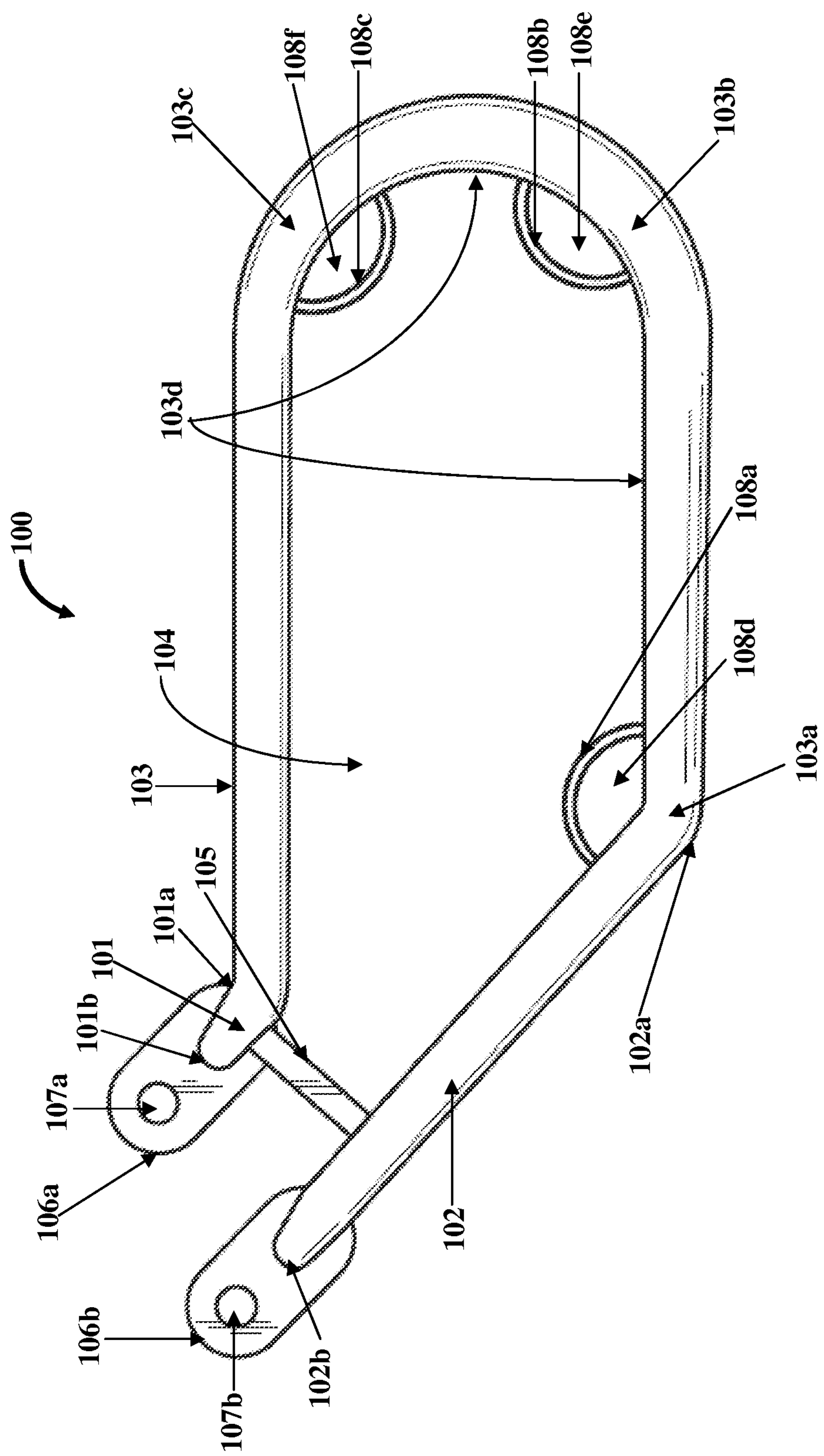
FIGS. 1A-1F exemplarily illustrate different elevation views of a saddlebag support apparatus.
Figure 1B:
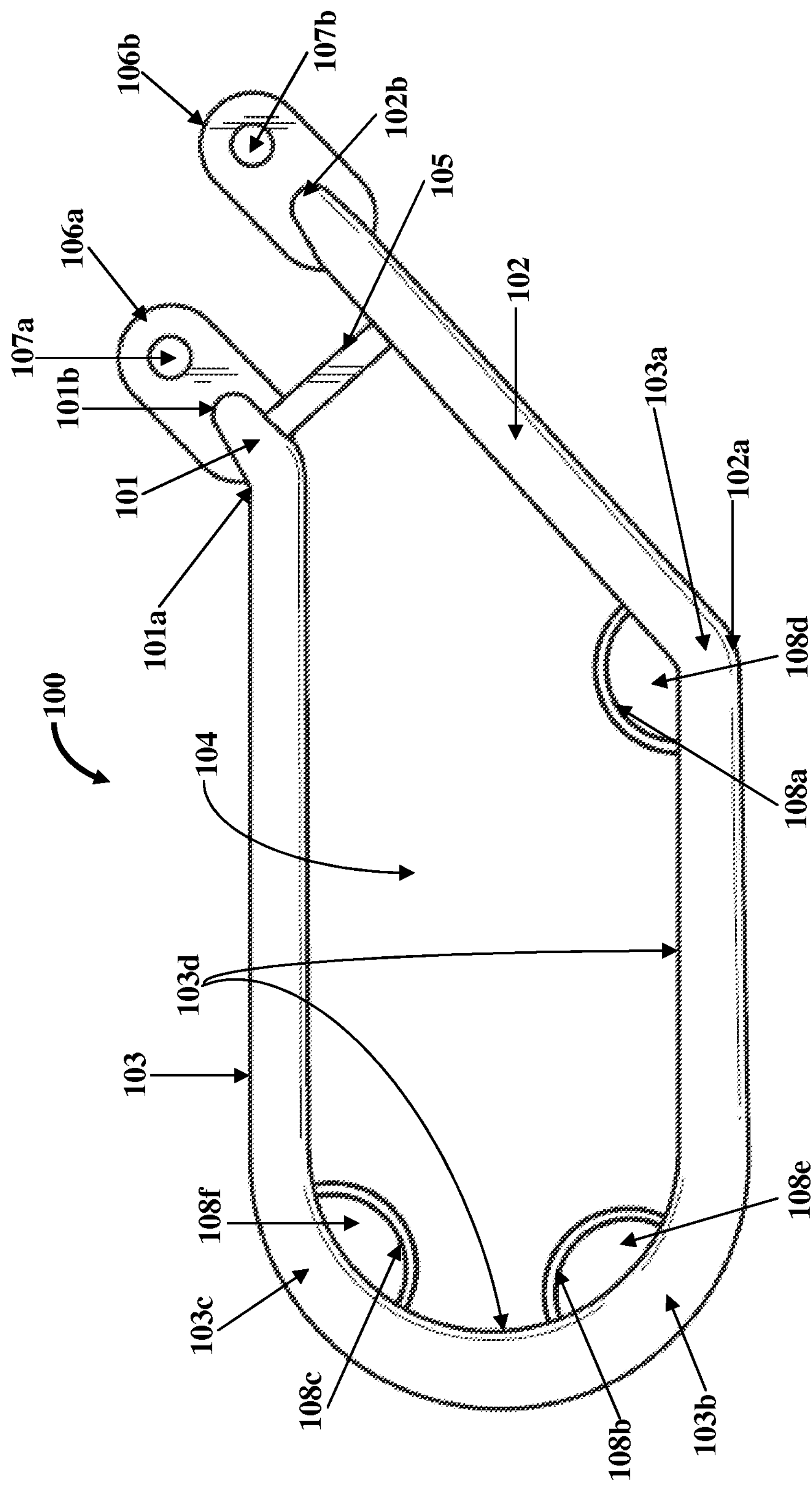
Figure 1C:
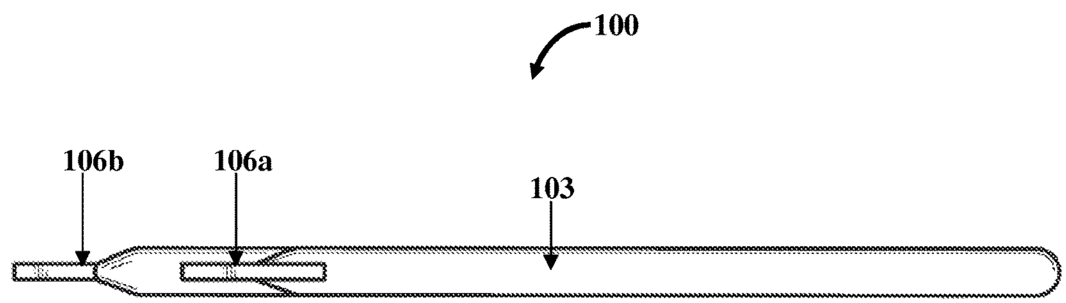
Figure 1D:
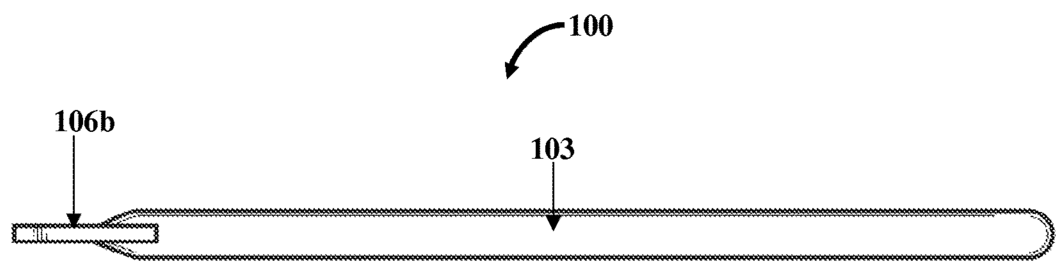
Figure 1E:
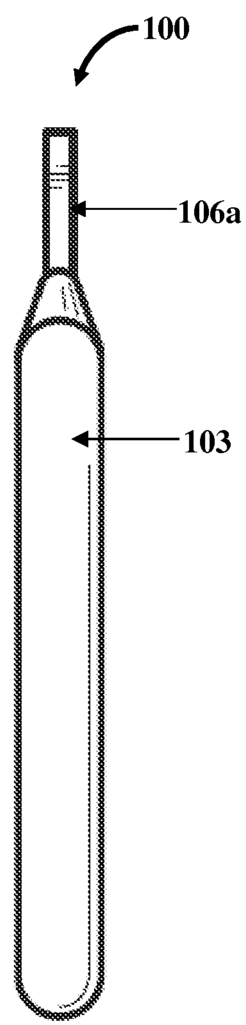
Figure 1F:
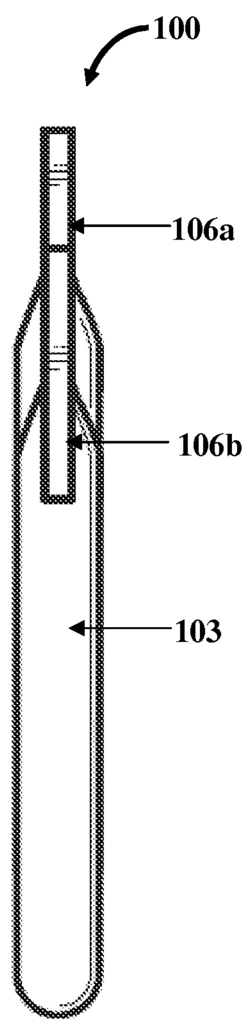

FIGS. 1A-1F exemplarily illustrate different elevation views of a saddlebag support apparatus 100. As used herein, the term "saddlebag" refers to a storage bag used for storage of items or cargo and that is removably attached to a saddle of a vehicle 301 exemplarily illustrated in FIG. 5 and FIGS. 6A-6B. In an embodiment, the vehicle 301 is a two wheeled vehicle, for example, a bicycle, a motorcycle, etc. The saddlebag support apparatus 100 disclosed herein is made of, for example, tube steel or solid round steel with a diameter of, for example, about ¾ inches. FIG. 1A and FIG. 1B exemplarily illustrate a front elevation view and a rear elevation view of the saddlebag support apparatus 100 respectively. FIG. 1C and FIG. 1D exemplarily illustrate a top plan view and a bottom elevation view of the saddlebag support apparatus 100 respectively. FIG. 1E and FIG. 1F exemplarily illustrate a right side elevation view and a left side elevation view of the saddlebag support apparatus 100 respectively.

The saddlebag support apparatus 100 disclosed herein comprises at least two arms 101 and 102 and a support frame 103. The arms 101 and 102 are removably connected to a rear section 301*a* of a vehicle 301 as exemplarily illustrated in FIG. 3. As exemplarily illustrated in FIGS. 1A-1B, the arm 102 is substantially longer than the arm 101. The support frame 103 is configured as a bracket with a geometric shape, for example, a partially oval shape. In an embodiment, the support frame 103 is a generally rectangular frame with generally curved corners. The support frame 103 extends from lower ends 101*a* and 102*a* of the arms 101 and 102 respectively. The support frame 103 defines a receptacle 104 for receiving one or more attachment elements 202 of a saddlebag 201 to secure the saddlebag 201 to the support frame 103 as exemplarily illustrated in FIGS. 2A-2C, FIG. 5, and FIGS. 6A-6B.

In an embodiment, the saddlebag support apparatus 100 disclosed herein further comprises an interconnecting member 105 positioned and connected between the arms 101 and 102 and substantially perpendicular to each of the arms 101 and 102. The interconnecting member 105 precludes deflection of the support frame 103 when the saddlebag 201 is mounted onto the support frame 103, thereby providing rigidity to the support frame 103. In an embodiment, the interconnecting member 105 is a solid stiffening member welded between the arms 101 and 102. In an embodiment, the saddlebag support apparatus 100 disclosed herein further comprises mounting brackets 106*a* and 106*b* as exemplarily illustrated in FIGS. 1A-1B, rigidly attached to upper ends 101*b* and 102*b* of the arms 101 and 102 respectively. The mounting brackets 106*a* and 106*b* comprises through holes 107*a* and 107*b* respectively, exemplarily illustrated in FIGS. 1A-1B, for receiving fastening attachments 109*a* and 109*b* exemplarily illustrated in FIG. 3 and FIGS. 4A-4B, that fasten the saddlebag support apparatus 100 to the rear section 301*a* of the vehicle 301.

In an embodiment as exemplarily illustrated in FIGS. 1A-1B, the saddlebag support apparatus 100 disclosed herein further comprises one or more connector elements 108*a*, 108*b*, and 108*c* positioned at predetermined locations on an inner plane 103*d* of the support frame 103. In an embodiment, one connector element 108*a* is positioned at a bend 103*a* defined between the lower end 102*a* of one arm 102 of the saddlebag support apparatus 100 and the support frame 103, while the two connector elements 108*b* and 108*c* are connected to curved sections 103*b* and 103*c* of the support frame 103 respectively. In an embodiment, the connector elements 108*a*, 108*b*, and 108*c* are of a geometric shape, for example, a semicircular shape. The connector elements 108*a*, 108*b*, and 108*c* comprise openings 108*d*, 108*e*, and 108*f* respectively, for receiving and accommodating one or more attachment elements 202 of the saddlebag 201 exemplarily illustrated in FIGS. 2A-2C, FIG. 5, and FIGS. 6A-6B, to secure the saddlebag 201 to the support frame 103.

In an embodiment, the arms 101 and 102 and the support frame 103 of the saddlebag support apparatus 100 are made of, for example, about ½ inch or ⅝ inch diameter tube steel or tube stock that is machine bent. The height of the support frame 103 is, for example, about 5.5 inches to about 6.5 inches, and the width of the support frame 103 is, for example, about 10 inches to about 11 inches. The height of the receptacle 104 of the support frame 103 is, for example, about 4.5 inches to about 5.5 inches and the width of the receptacle 104 of the support frame 103 is, for example, about 9 inches to about 10 inches. The length of the interconnecting member 105 is, for example, about 2 inches.

Figure 2A:
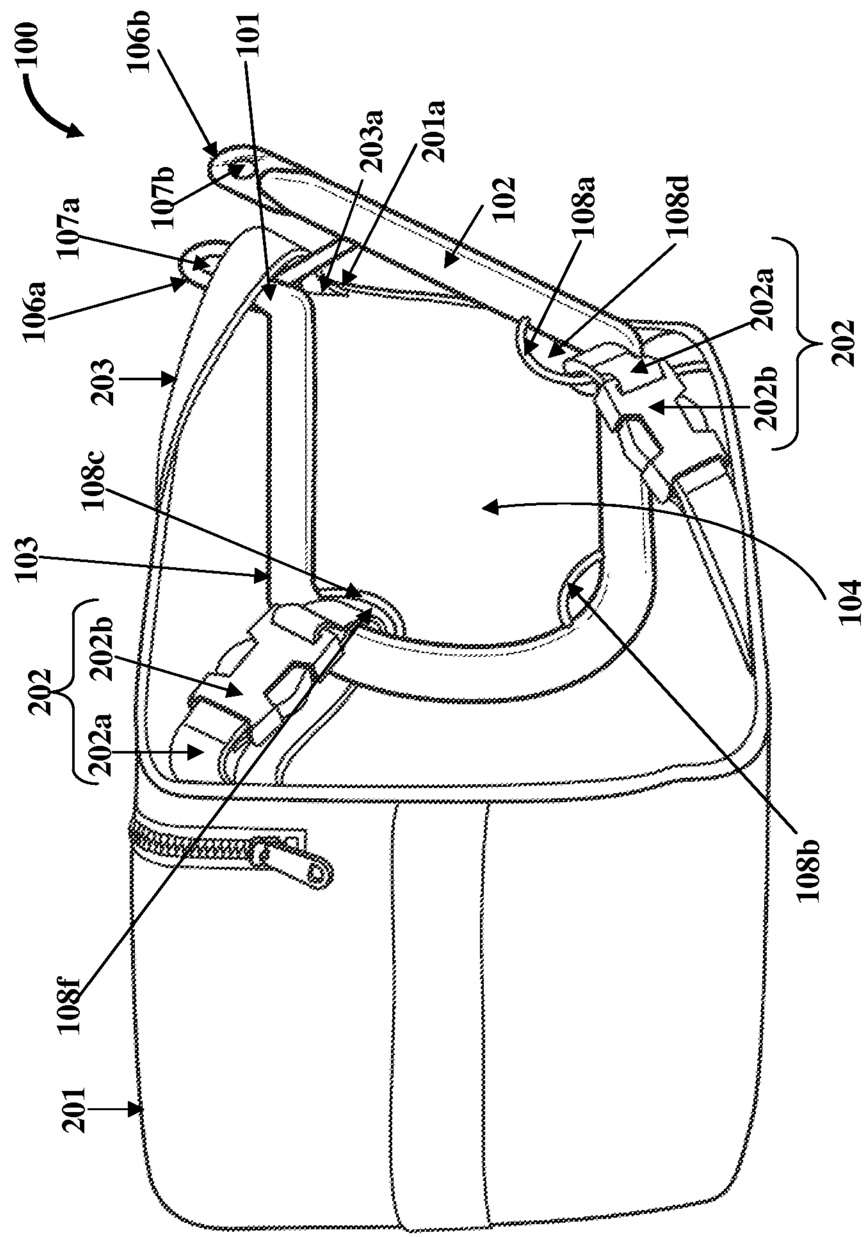
FIG. 2A exemplarily illustrates a rear perspective view of the saddlebag support apparatus, showing a saddlebag secured to the saddlebag support apparatus.
Figure 2B:
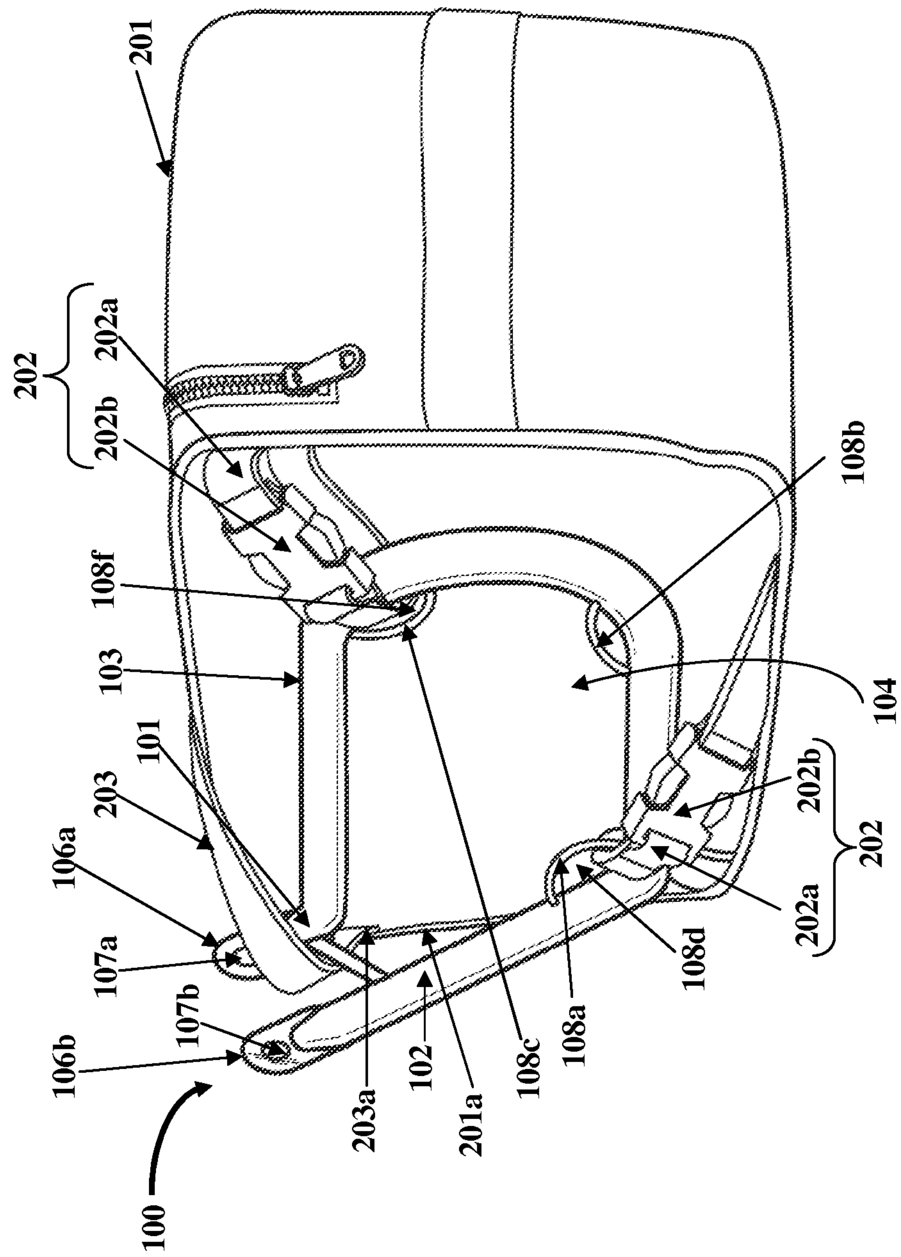
FIG. 2B exemplarily illustrates a front perspective view of the saddlebag support apparatus, showing a saddlebag secured to the saddlebag support apparatus.

FIGS. 2A-2B exemplarily illustrate a rear perspective view and a front perspective view of the saddlebag support apparatus 100, showing a saddlebag 201 secured to the saddlebag support apparatus 100. The saddlebag 201 comprises one or more attachment elements 202 for securing the saddlebag 201 to the support frame 203 of the saddlebag support apparatus 100. The attachment elements 202 of the saddlebag 201 comprise, for example, straps 202*a* made of, for example, fabric, leather, etc., used for suspending the saddlebag 201, and fasteners 202*b*, for example, snap fit fasteners such as buckle fasteners for fastening the straps 202*a* of the saddlebag 201 to the saddlebag support apparatus 100. The attachment elements 202 of the saddlebag 201 can be attached to any one or more of the connector elements 108*a*, 108*b*, and 108*c* of the saddlebag support apparatus 100. For example, two straps 202*a* of the saddlebag 201 are inserted into the openings 108*d* and 108*f* of two connector elements 108*a* and 108*c* respectively, and fastened using the fasteners 202*b* as exemplarily illustrated in FIGS. 2A-2B, to secure the saddlebag 201 to the saddlebag support apparatus 100. In an embodiment, another strap 203 of the saddlebag 201 can be connected to the arm 101 of the saddlebag support apparatus 100. One end 203*a* of the strap 203 is sewn into a side 201*a* of the saddlebag 201. The strap 203 extends from the side 201*a* of the saddlebag 201, over the top of the saddlebag 201 to the other side 201*b* of the saddlebag 201 exemplarily illustrated in FIG. 2C. In an embodiment, the strap 203 is made of a flexible material, for example, leather, of width, for example, about 1 inch.

Figure 2C:
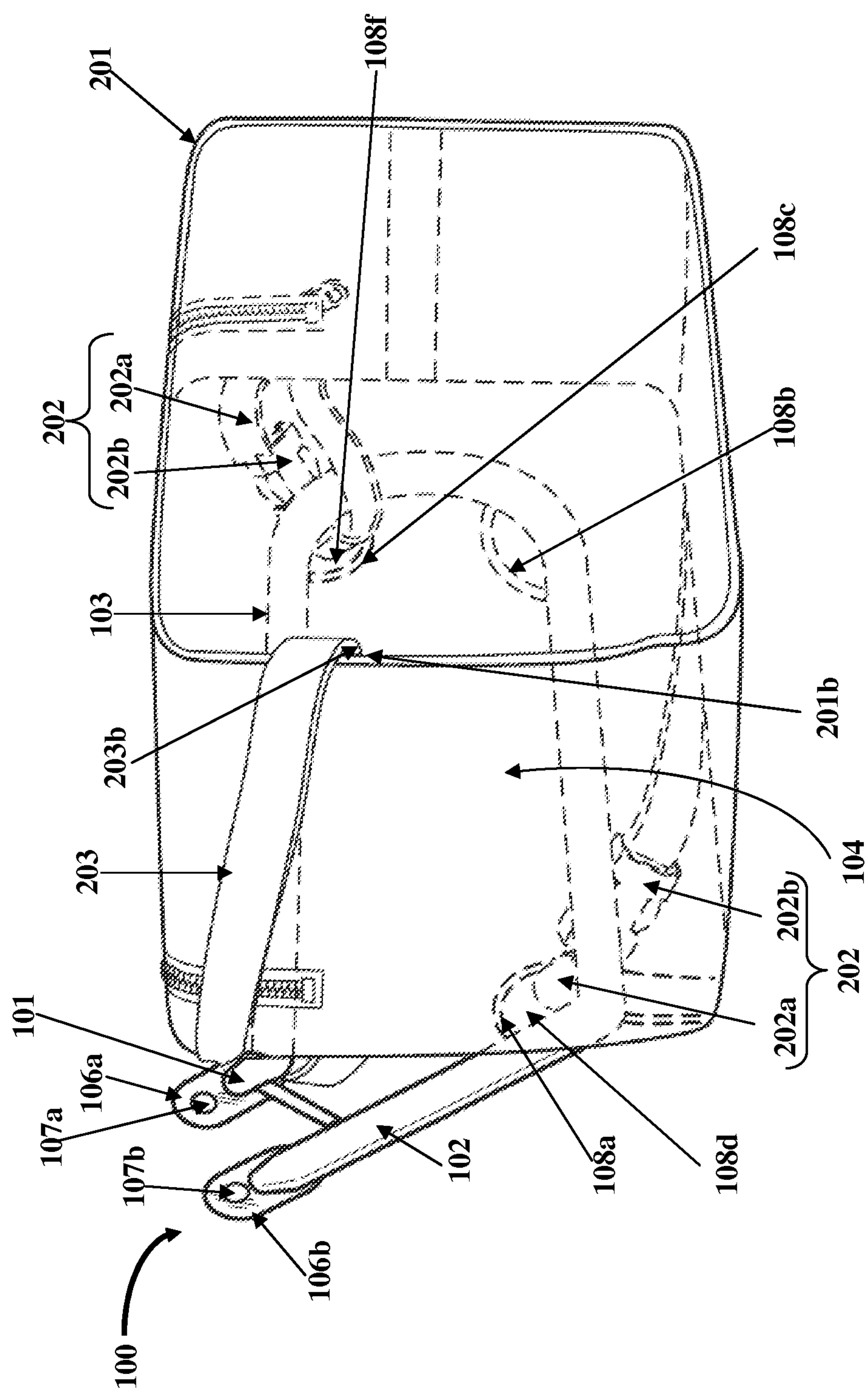
FIG. 2C exemplarily illustrates a perspective view of the saddlebag support apparatus, showing a saddlebag secured to the saddlebag support apparatus.

FIG. 2C exemplarily illustrates a perspective view of the saddlebag support apparatus 100, showing a saddlebag 201 secured to the saddlebag support apparatus 100. In addition to the attachment elements 202 comprising the straps 202*a* and the fasteners 202*b*, the saddlebag 201 further comprises the strap 203 connected to opposing sides 201*a* and 201*b* of the saddlebag 201 as exemplarily illustrated in FIGS. 2A-2C. One end 203*a* of the strap 203 is sewn into one side 201*a* of the saddlebag 201 exemplarily illustrated in FIGS. 2A-2B, and the other end 203*b* of the strap 203 is sewn into the other side 201*b* of the saddlebag 201 as exemplarily illustrated in FIG. 2C. In an embodiment, the strap 203 extends from the sides 201*a* and 201*b* of the saddlebag 201 and loops around the arm 101 of the saddlebag support apparatus 100 to hold the saddlebag 201 to the support frame 103 of the saddlebag support apparatus 100. In another embodiment, the strap 203 can be wound through any one or more of the connector elements 108*a*, 108*b*, and 108*c* of the saddlebag support apparatus 100 to secure the saddlebag 201 to the support frame 103 of the saddlebag support apparatus 100. In an embodiment, when the saddlebag 201 is detached from the saddlebag support apparatus 100, the strap 203 of the saddlebag 201 allows a user to pick up and carry the saddlebag 201.

Figure 3:
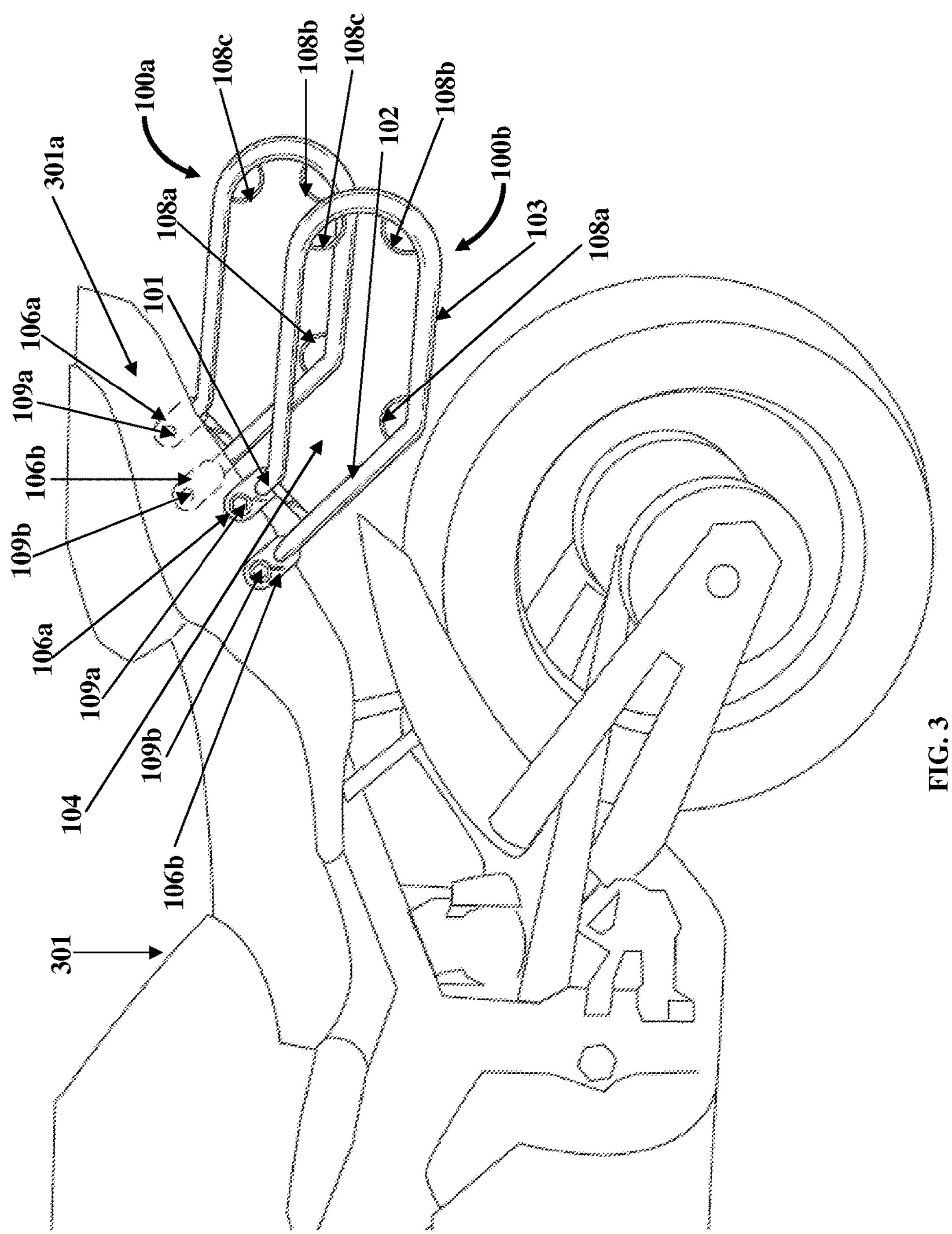
FIG. 3 exemplarily illustrates a rear perspective view of a vehicle, showing a pair of saddlebag support apparatuses attached to a rear section of the vehicle.

FIG. 3 exemplarily illustrates a rear perspective view of a vehicle 301, showing a pair of saddlebag support apparatuses 100*a* and 100*b* attached to a rear section 301*a* of the vehicle 301. The pair of saddlebag support apparatuses 100*a* and 100*b* is, for example, a pair of flexible saddlebag brackets configured as aftermarket mounting brackets to be attached to a vehicle 301, for example, a motorcycle to hold different types of aftermarket flexible saddlebags 201 exemplarily illustrated in FIGS. 6A-6B. The rear section 301*a* of the motorcycle is referred to as a rear cowl. The pair of saddlebag support apparatuses 100*a* and 100*b* is fastened to the rear cowl of the motorcycle. In an embodiment, the pair of saddlebag support apparatuses 100*a* and 100*b* is attached to the rear cowl by drilling holes through the rear cowl, positioning the through holes 107*a* and 107*b* of the mounting brackets 106*a* and 106*b* respectively, of the saddlebag support apparatuses 100*a* and 100*b* coaxial with the drilled holes on the rear cowl, and fastening the saddlebag support apparatuses 100*a* and 100*b* to the rear cowl by using the fastening attachments 109*a* and 109*b*.

Figure 4A:
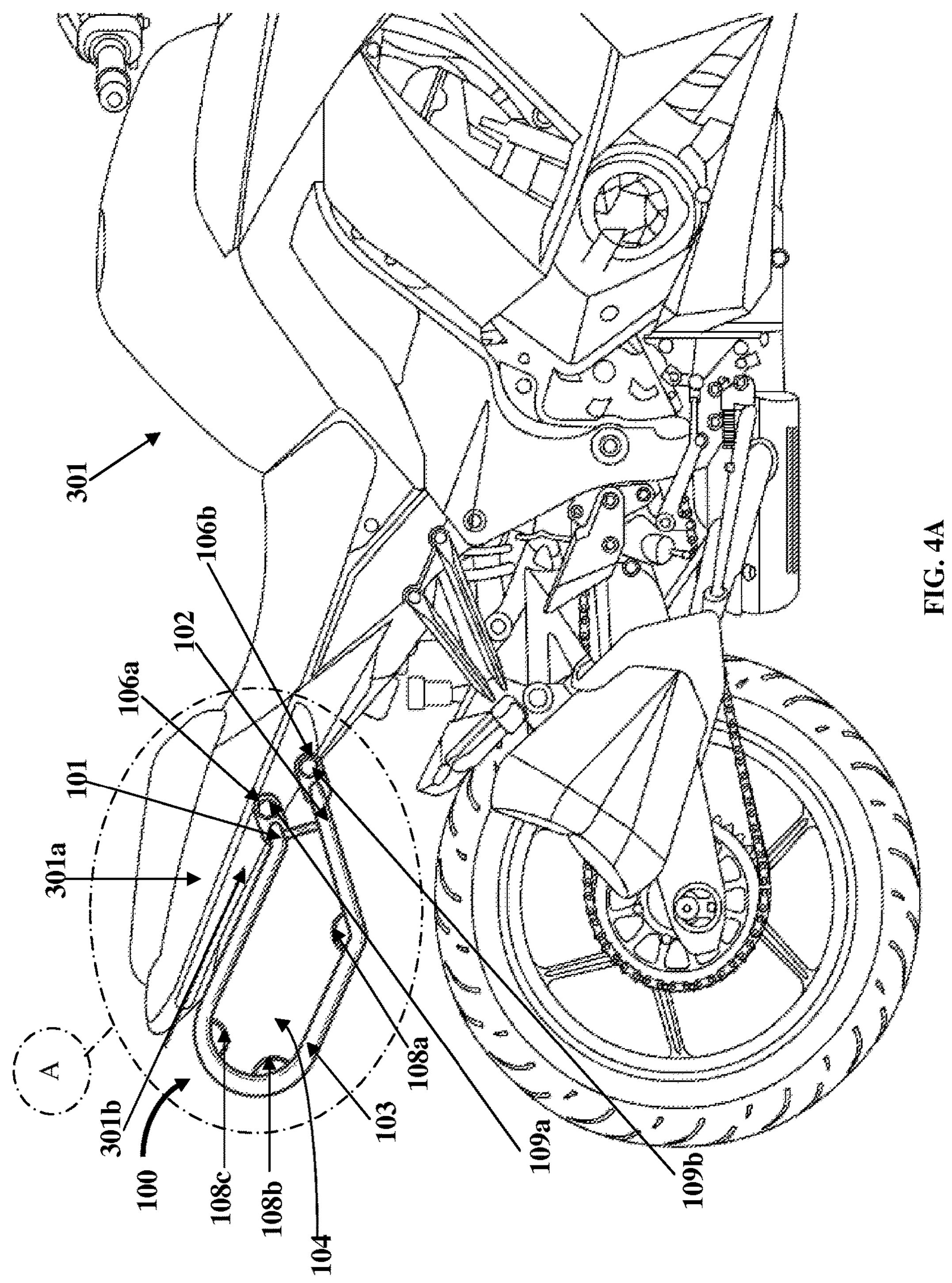
FIG. 4A exemplarily illustrates a right side elevation view of a vehicle, showing a single saddlebag support apparatus attached to a rear section of the vehicle using fastening attachments.
Figure 4B:
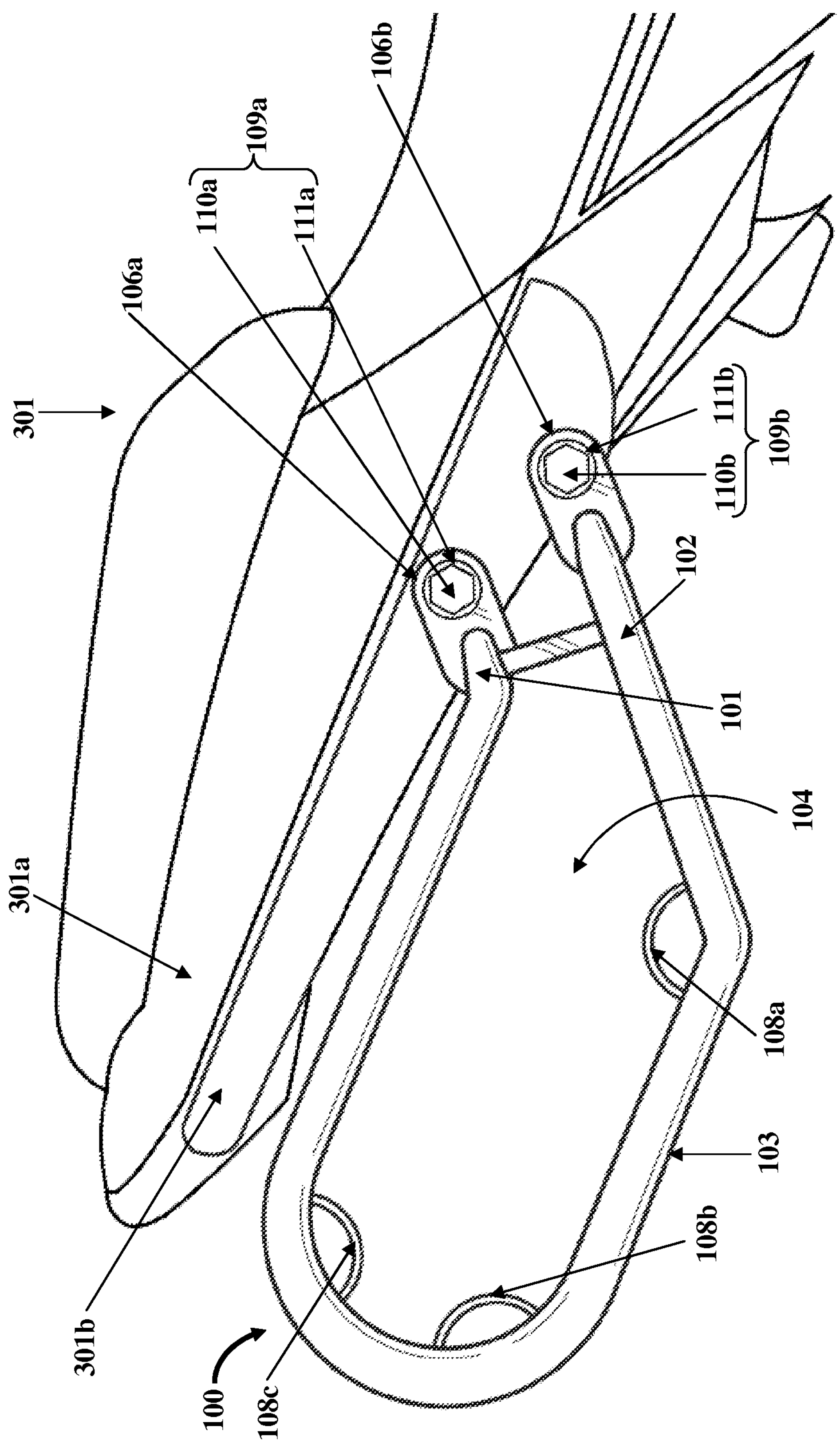
FIG. 4B exemplarily illustrates an enlarged view of a portion marked A in FIG. 4A.

FIG. 4A exemplarily illustrates a right side elevation view of a vehicle 301, showing a single saddlebag support apparatus 100 attached to a rear section 301*a* of the vehicle 301 using the fastening attachments 109*a* and 109*b*. FIG. 4B exemplarily illustrates an enlarged view of a portion marked A in FIG. 4A. In an embodiment, fastening attachments 109*a* and 109*b* are inserted through the through holes 107*a* and 107*b* of the mounting brackets 106*a* and 106*b* on the arms 101 and 102 respectively, of the saddlebag support apparatus 100 to fasten the saddlebag support apparatus 100 to the rear section 301*a* of the vehicle 301. The fastening attachments 109*a* and 109*b* comprise, for example, about 8 millimeters (mm)×1.25 mm bolts 110*a* and 110*b* respectively, with a length of about 80 mm to about 90 mm, and washers 111*a* and 111*b* respectively as exemplarily illustrated in FIG. 4B. A user can remove the original equipment manufacturer (OEM) bolts positioned, for example, on the rear section 301*a* of the vehicle 301 to fix the fastening attachments 109*a* and 109*b* that are configured for the saddlebag support apparatus 100. The saddlebag support apparatus 100 can be attached to the rear section 301*a* of the vehicle 301 in the presence or absence of original equipment manufacturer (OEM) fenders. The mounting brackets 106*a* and 106*b* on the arms 101 and 102 of the saddlebag support apparatus 100 respectively, can be bolted to a rear passenger handle 301*b* on the rear section 301*a* of the vehicle 301 by replacing the original fasteners with longer bolts 110*a* and 110*b* and washers 111*a* and 111*b* respectively. This allows the rear passenger handle 301*b* to remain functional and operate with or without a rear fender and/or mufflers installed. A rear passenger handle 301*b* is an attachment typically positioned on the rear section 301*a* of the vehicle 301, for example, a motorcycle, and that can be held by a passenger for support while the passenger sits on a passenger side of the vehicle 301, behind a rider of the vehicle 301.

A user can attach a flexible saddlebag 201 exemplarily illustrated in FIGS. 2A-2C, to the vehicle 301, for example, a sports bike using the saddlebag support apparatus 100. For purposes of illustration, the detailed description refers to the use of the saddlebag support apparatus 100 with respect to sports bikes and motorcycles; however the scope of the saddlebag support apparatus 100 disclosed herein is not limited to usage with sports bikes and motorcycles, but may be extended to be used in multiple different two wheeled vehicles.

Figure 5:
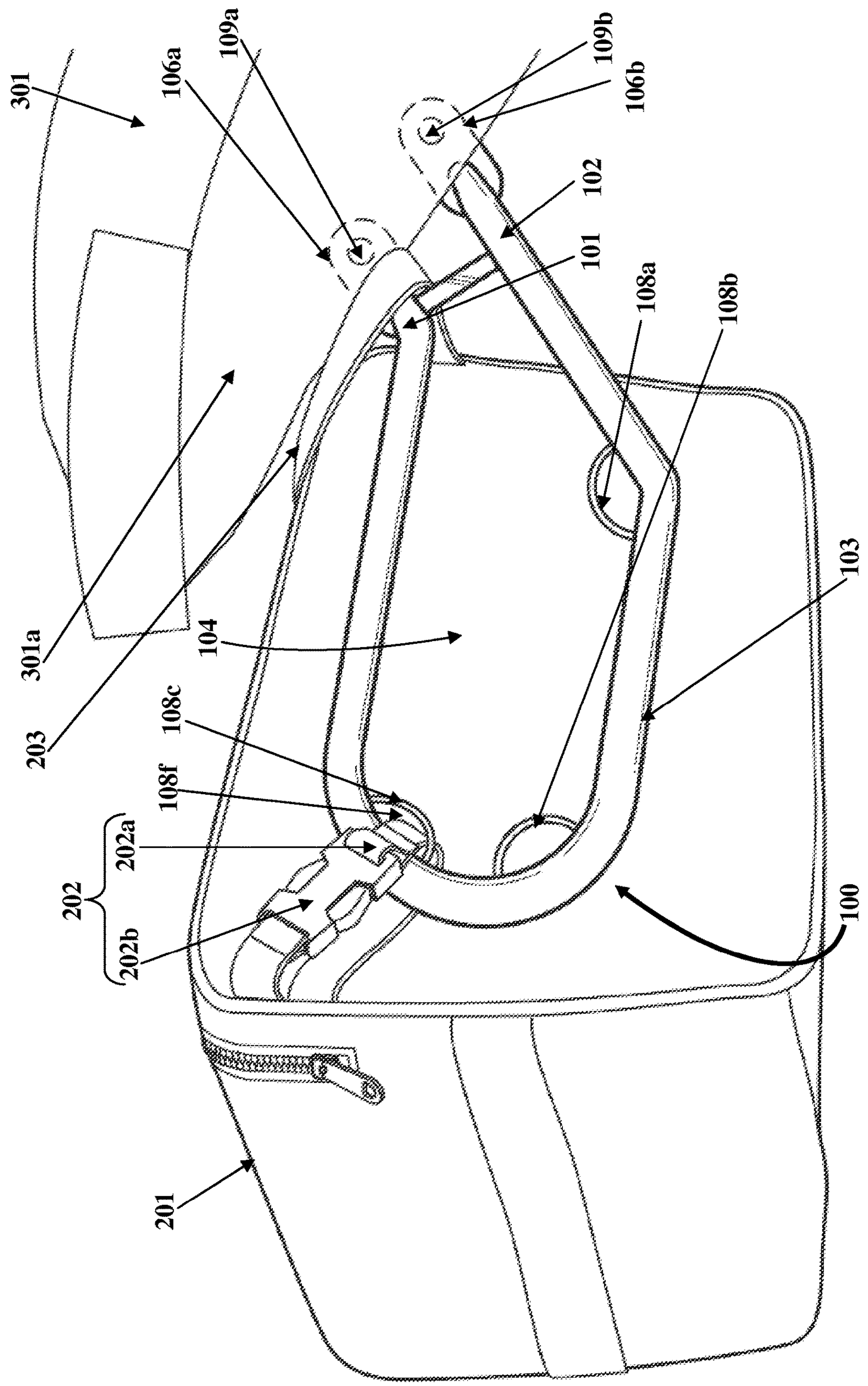
FIG. 5 exemplarily illustrates an enlarged view of the saddlebag support apparatus, showing a saddlebag secured to the saddlebag support apparatus.

FIG. 5 exemplarily illustrates an enlarged view of the saddlebag support apparatus 100, showing a saddlebag 201 secured to the saddlebag support apparatus 100. The attachment element 202 of the saddlebag 201 can be attached to any one of the connector elements 108*a*, 108*b*, and 108*c* of the saddlebag support apparatus 100. For example, a strap 202*a* of the saddlebag 201 is inserted into the opening 108*f* of the connector element 108*c*, and fastened using the fastener 202*b* as exemplarily illustrated in FIG. 5, to secure the saddlebag 201 to the saddlebag support apparatus 100. In an embodiment, another strap 203 of the saddlebag 201 is wound around the arm 101 of the saddlebag support apparatus 100 as exemplarily illustrated in FIG. 5, prior to attaching the saddlebag support apparatus 100 to the rear section 301*a* of the vehicle 301 using the fastening attachments 109*a* and 109*b*.

Figure 6A:
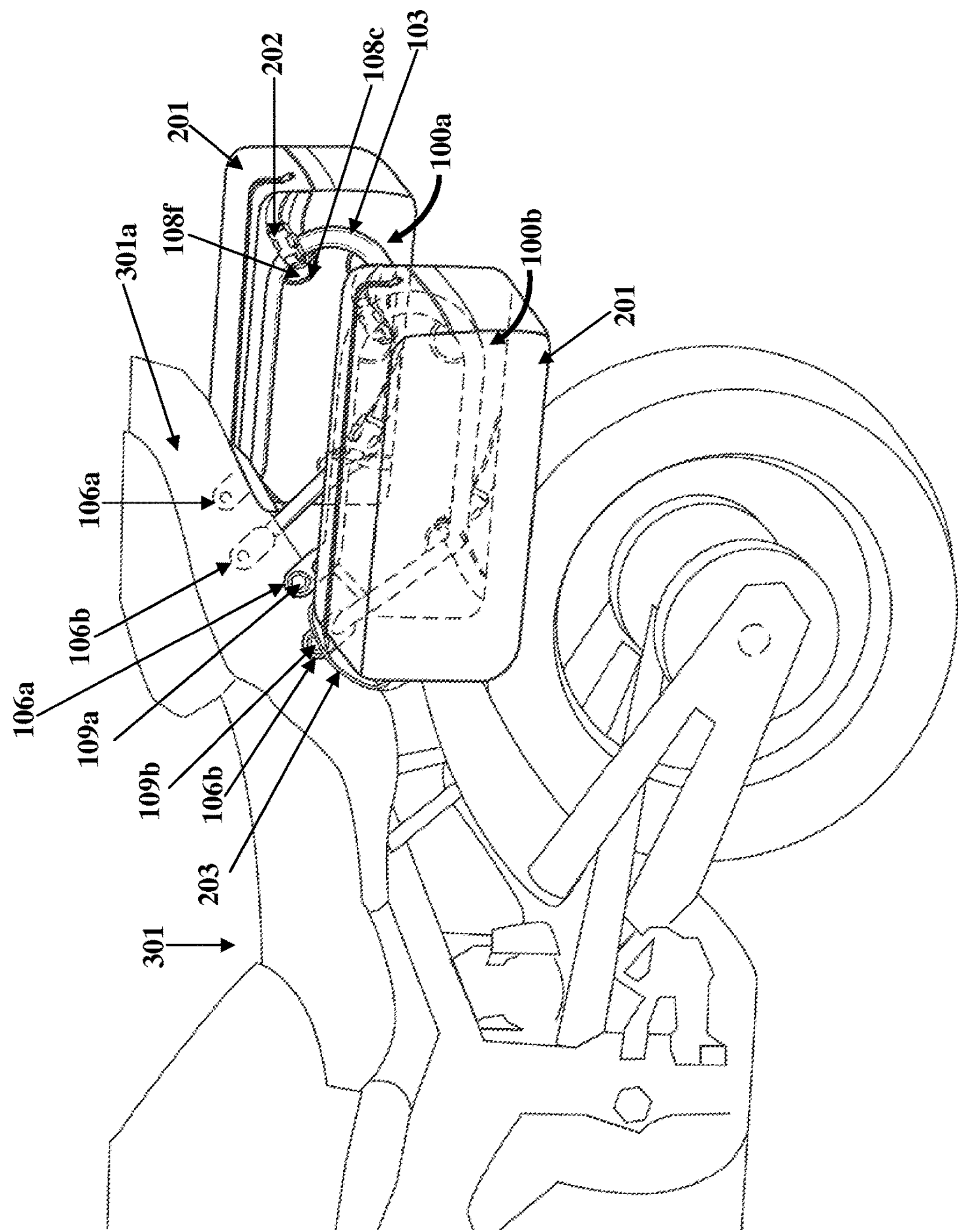
FIG. 6A exemplarily illustrates a left side perspective view of a vehicle, showing a pair of saddlebag support apparatuses attached to a rear section of the vehicle and saddlebags secured to the saddlebag support apparatuses.

FIG. 6A exemplarily illustrates a left side perspective view of a vehicle 301, showing a pair of saddlebag support apparatuses 100*a* and 100*b* attached to a rear section 301*a* of the vehicle 301 and saddlebags 201 secured to the saddlebag support apparatuses 100*a* and 100*b*. In an embodiment, a kit comprising one or a set of saddlebag support apparatuses 100*a* and 100*b* and one or a set of saddlebags 201 is provided. The saddlebags 201 are detachably attached to the saddlebag support apparatuses 100*a* and 100*b* for carrying items on the vehicle 301. Each of the saddlebag support apparatuses 100*a* and 100*b* comprises at least two arms 101 and 102, a support frame 103, and one or more connector elements 108*a*, 108*b*, and 108*c* as disclosed in the detailed description of FIGS. 1A-1F. In an embodiment, the kit further comprises fastening attachments 109*a* and 109*b* for fastening the saddlebag support apparatuses 100*a* and 100*b* to the rear section 301*a* of the vehicle 301 via the through holes 107*a* and 107*b* of the mounting brackets 106*a* and 106*b* respectively, of the saddlebag support apparatuses 100*a* and 100*b*. The saddlebags 201 are removably attached to the saddlebag support apparatuses 100*a* and 100*b* positioned on the rear section 301*a* of the vehicle 301. Each of the saddlebags 201 comprises attachment elements 202 configured to be inserted into any one or more of the openings 108*d*, 108*e*, and 108*f* of the connector elements 108*a*, 108*b*, and 108*c* respectively, of each of the saddlebag support apparatuses 100*a* and 100*b*. The attachment elements 202 of each saddlebag 201 are secured to the support frame 103 of each of the saddlebag support apparatuses 100*a* and 100*b*.

Figure 6B:
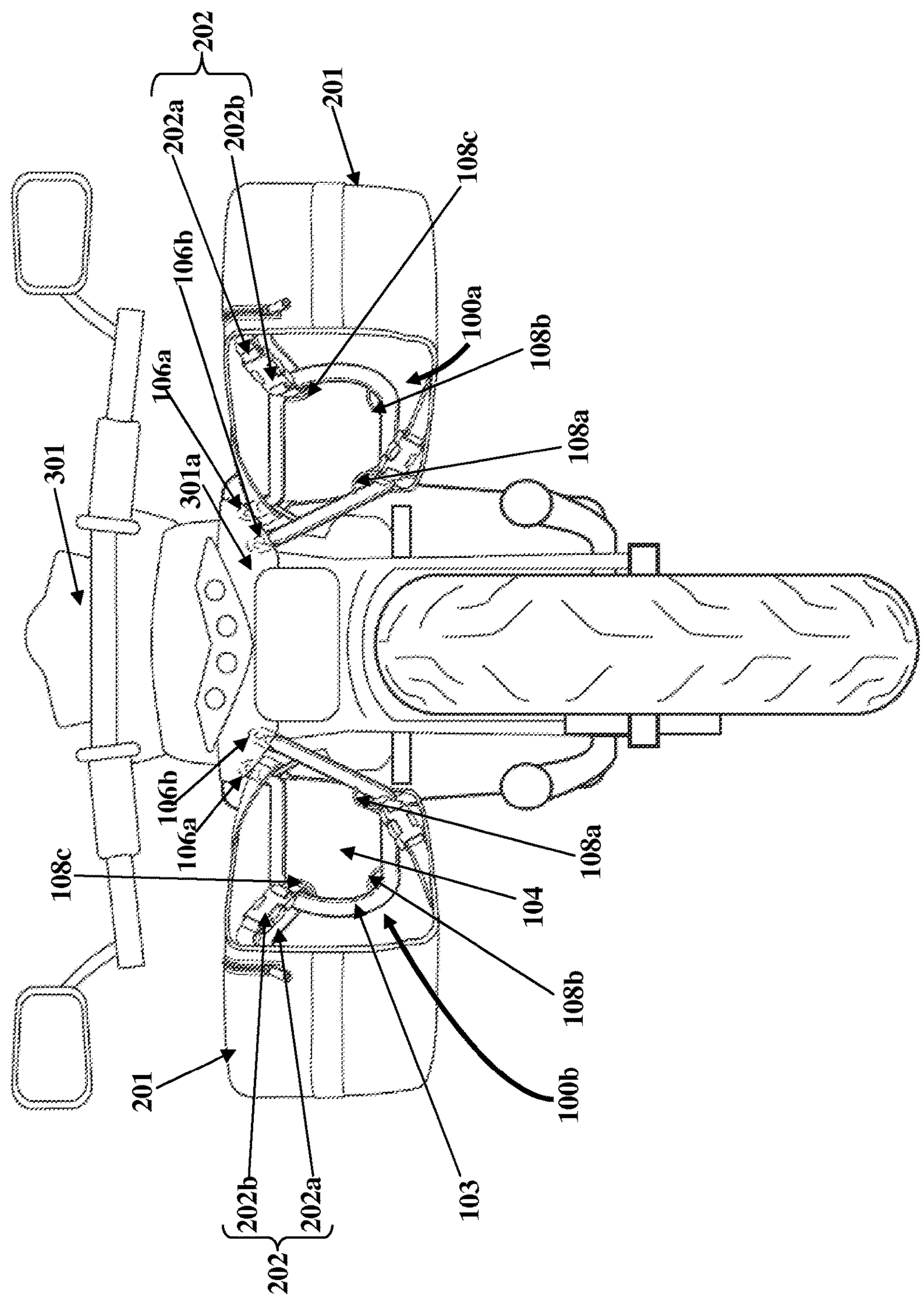
FIG. 6B exemplarily illustrates a rear elevation view of a vehicle, showing a pair of saddlebag support apparatuses attached to a rear section of the vehicle and saddlebags secured to the saddlebag support apparatuses.

FIG. 6B exemplarily illustrates a rear elevation view of a vehicle 301, showing a pair of saddlebag support apparatuses 100*a* and 100*b* attached to a rear section 301*a* of the vehicle 301 and saddlebags 201 secured to the saddlebag support apparatuses 100*a* and 100*b*. Each saddlebag 201 is removably attached to the support frame 103 of each of the saddlebag support apparatuses 100*a* and 100*b* using the attachment elements 202 through the connector elements 108*a* and 108*c* as exemplarily illustrated in FIGS. 6A-6B. The connector elements 108*a*, 108*b*, and 108*c* of the saddlebag support apparatuses 100*a* and 100*b* allow the saddlebags 201 to be secured within the receptacle 104 of the support frame 103 using one or more attachment elements 202 of the saddlebags 201. The saddlebag support apparatuses 100*a* and 100*b* accommodate saddlebags 201 of a larger size than the size of the support frames 103 of the saddlebag support apparatuses 100*a* and 100*b*. The straps 202*a* of the saddlebags 201 pass through one or more of the connector elements 108*a*, 108*b*, and 108*c* on the support frames 103 of the saddlebag support apparatuses 100*a* and 100*b*. In an embodiment, an attachment element 202 of a saddlebag 201 is directly wound through the receptacle 104 defined by the support frame 103 and fastened around the support frame 103 as disclosed in the provisional patent application No. 62/069,818 titled "Saddlebag Support Apparatus", filed in the United States Patent and Trademark Office on Oct. 28, 2014. The saddlebags 201 hang onto the sides of the vehicle 301, for example, the motorcycle without affecting operation of components, for example, the rear fender, mufflers, passenger handles, etc., of the motorcycle. One or more saddlebags 201 of different sizes can be attached to the motorcycle using the saddlebag support apparatuses 100*a* and 100*b*.

The support frame 103 of the saddlebag support apparatus 100 exemplarily illustrated in FIGS. 1A-1F, is made of tube steel that is bent or stamped according to a pattern or a die. When a large scale production of the saddlebag support apparatus 100 is required, suitable jigs and other assembly aids are needed to speed the production rate and consistency of the saddlebag support apparatus 100. After the saddlebag support apparatus 100 is manufactured, a protective finish, for example, paint or plating is applied to the saddlebag support apparatus 100 to prevent corrosion. The cost involved in the manufacture of the saddlebag support apparatus 100 is low due to the relatively low material costs and labor costs involved. A semi-skilled worker can be employed for manufacturing the saddlebag support apparatus 100. The manufacturing process of the saddlebag support apparatus 100 comprises, for example, steel stamping and forming methods, welding methods, coating methods, mechanical device assembly methods, and associated mass production assembly technologies.

The foregoing examples have been provided merely for the purpose of explanation and are in no way to be construed as limiting of the saddlebag support apparatus 100 disclosed herein. While the saddlebag support apparatus 100 has been described with reference to various embodiments, it is understood that the words, which have been used herein, are words of description and illustration, rather than words of limitation. Further, although the saddlebag support apparatus 100 has been described herein with reference to particular means, materials, and embodiments, the saddlebag support apparatus 100 is not intended to be limited to the particulars disclosed herein; rather, the saddlebag support apparatus 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the saddlebag support apparatus 100 disclosed herein in its aspect.

I claim:

1. A support apparatus for mounting a flexible saddlebag to a vehicle, comprising:

a pair of arms removably connected to a rear section of said vehicle;

a support frame having a geometric shape, said support frame extending from a lower end of one of said pair of arms to a lower end of another one of said pair of arms;

an interconnecting member positioned and connecting said pair of arms, wherein said interconnecting member is substantially perpendicular to each of said pair of arms;

a plurality of connector elements connected at predetermined locations on said support frame to define a plurality of openings between each of said connector elements and said support frame, wherein each of said openings between each of said connector elements and said support frame facilitate mounting of said flexible saddlebag to said support frame; and mounting brackets rigidly attached to upper ends of said pair of arms, wherein said mounting brackets comprise through holes for receiving fastening attachments that fasten said support apparatus to said rear section of said vehicle.

2. The support apparatus of claim 1, wherein said interconnecting member is configured to preclude deflection of said support frame when said flexible saddlebag is mounted onto said support frame, thereby providing rigidity to said support frame.

3. The support apparatus of claim 1, wherein one of said pair of arms is substantially longer than another one of said pair of arms.

4. A kit, comprising:

a flexible saddlebag, comprising:

a flexible storage bag;

a primary flexible strap affixed to said flexible saddlebag for holding said flexible saddlebag onto a support frame of a support apparatus fixed on a rear section of a vehicle; and a plurality of attachment elements, comprising:

ancillary flexible straps; and fasteners for locking said ancillary flexible straps to securely fix said flexible saddlebag onto said support apparatus;

said support apparatus for mounting said flexible saddlebag to said vehicle, comprising:

a pair of arms removably connected to said rear section of said vehicle;

said support frame having a geometric shape, wherein said support frame extends from a lower end of one of said pair of arms to a lower end of another one of said pair of arms;

an interconnecting member positioned and connecting said pair of arms, wherein said interconnecting member is substantially perpendicular to each of said pair of arms; and a plurality of connector elements connected at predetermined locations on said support frame to define a plurality of openings between each of said connector elements and said support frame, and wherein said ancillary flexible straps of said flexible saddlebag are locked within each of said openings of said support apparatus using said fasteners, for facilitating said mounting of said flexible saddlebag to said support frame.

5. The kit of claim 4, wherein said interconnecting member is configured to preclude deflection of said support frame when said flexible saddlebag is mounted onto said support frame, thereby providing rigidity to said support frame.

6. The kit of claim 4, wherein one of said pair of arms is substantially longer than said another one of said pair of arms.

7. The kit of claim 4, wherein said support apparatus further comprises mounting brackets comprising through holes, wherein said mounting brackets are rigidly attached to upper ends of said pair of arms.

8. The kit of claim 7, further comprising fastening attachments for fastening said support apparatus to said rear section of said vehicle via said through holes.

9. The kit of claim 4, wherein said connector elements are positioned at on an inner plane of said support frame, and wherein said predetermined locations comprise one or more of a bend defined between said support frame and a lower end of a longer of said pair of arms, and curved sections of said support frame.

10. The kit of claim 4, wherein said mounting of said flexible saddlebag to said support frame comprises:

placing said flexible saddlebag over said support frame and winding said primary flexible strap over one of said pair of arms; and passing said ancillary flexible straps via said openings between said connector elements and said support frame and locking said ancillary flexible straps using said fasteners, for said secure fixing of said flexible saddlebag onto said support frame.

11. A support apparatus for mounting a flexible saddlebag to a vehicle, comprising:

a pair of arms removably connected to a rear section of said vehicle;

a support frame having a geometric shape, said support frame extending from a lower end of one of said pair of arms to a lower end of another one of said pair of arms;

an interconnecting member positioned and connecting said pair of arms, wherein said interconnecting member is substantially perpendicular to each of said pair of arms;

a plurality of connector elements connected at predetermined locations on said support frame to define a plurality of openings between each of said connector elements and said support frame, wherein each of said openings between each of said connector elements and said support frame facilitate mounting of said flexible saddlebag to said support frame, wherein said connector elements are positioned on an inner plane of said support frame, and wherein said predetermined locations comprise one or more of a bend defined between said support frame and a lower end of a longer of said pair of arms, and curved sections of said support frame.

12. A kit, comprising:

a flexible saddlebag, wherein said flexible saddlebag comprises a flexible storage bag, a plurality of flexible straps, and a plurality of attachment elements, wherein said plurality of attachment elements comprises ancillary flexible straps and fasteners;

said support apparatus for mounting said flexible saddlebag to said vehicle, comprising:

a pair of arms removably connected to said rear section of said vehicle;

said support frame having a geometric shape, wherein said support frame extends from a lower end of one of said pair of arms to a lower end of another one of said pair of arms;

an interconnecting member positioned and connected between said pair of arms, wherein said interconnecting member is substantially perpendicular to each of said pair of arms; and a plurality of connector elements connected at predetermined locations on said support frame to define a plurality of openings between each of said connector elements and said support frame, wherein said ancillary flexible straps of said flexible saddlebag are locked within each of said openings of said support apparatus using said fasteners, for facilitating said mounting of said flexible saddlebag to said support frame.

* * * * *